Patented Aug. 1, 1933

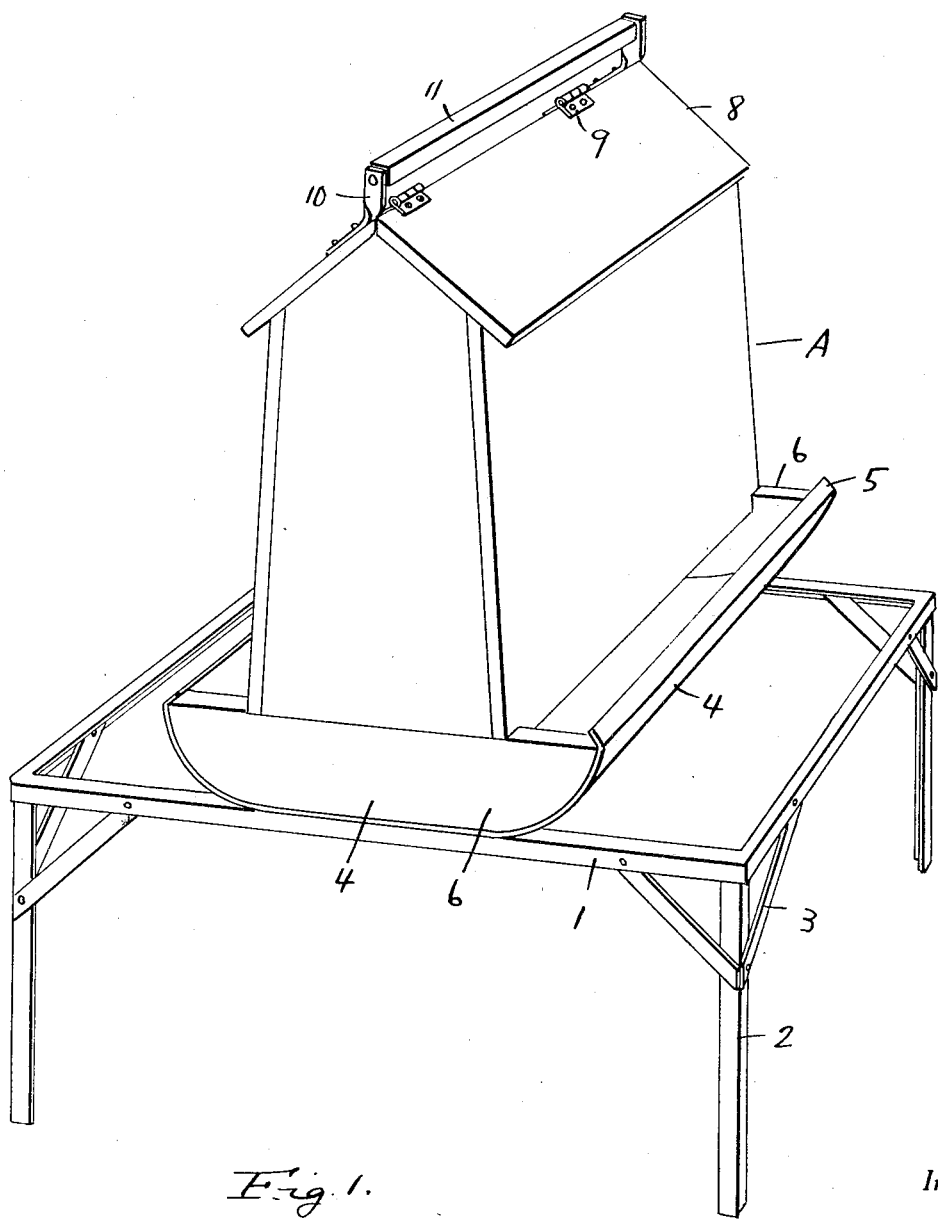

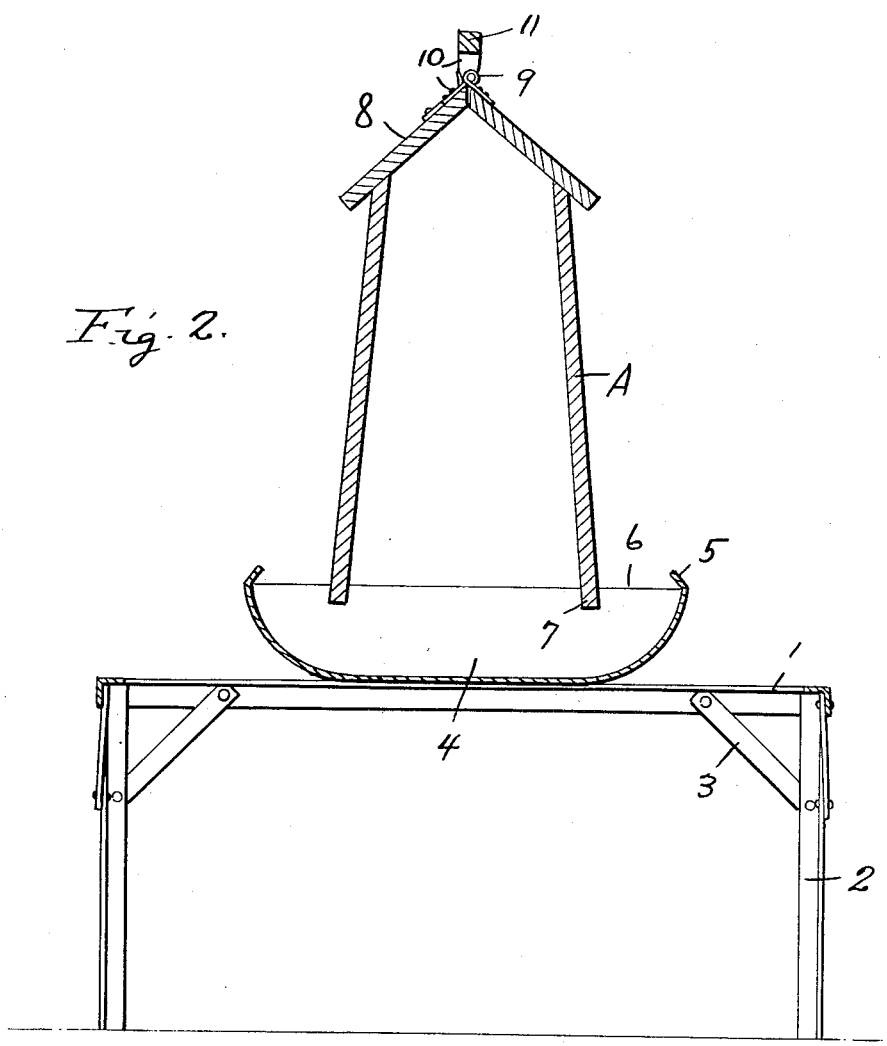

1,920,536

UNITED STATES PATENT OFFICE 1,920,536

POULTRY FEEDER

William F. Vahlkamp, Wayne, Nebr.

Application July 20, 1931. Serial No. 551,986.

1 Claim. (Cl. 119—52)

This invention relates to a poultry feeder the general object of the invention being to so construct and arrange the parts of the feeder that there is no danger of the feed becoming clogged therein so that the poultry can continue to feed from the device until all the feed has been consumed.

Another object of the invention is to provide means whereby the feed can be easily and quickly placed in the device with means for preventing the poultry from scattering or wasting the feed.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a perspective view of the device.

Figure 2 is a transverse sectional view therethrough.

In these views, the numeral 1 indicates a frame which is supported by the legs 2 which are braced from the frame by the braces 3.

A trough 4 has its ends resting on the side bars of the frame 1 and the trough and frame are of such dimensions that the poultry can rest on parts of the frame and feed from the trough. The trough is provided with a substantially flat bottom with its sides curving upwardly and outwardly as shown with the edges of the sides extended upwardly and inwardly as shown at 5 beyond the end pieces 6 of the trough.

A hopper A has its ends fastened to the ends of the trough with its sides having their lower edges extended into the trough as shown at 7, these sides being spaced from the sides of the trough so that the spaces between the sides of the trough and the sides of the hopper form feeding spaces from which the poultry can pick up the feed in the trough. As the hopper is supported by the ends 6 of the trough I make said ends of considerable thickness, as shown, and notch the lower corners of the sides of the hopper, in which notches portions of the ends of the trough fit. The lower edges of the sides of the hopper thus extend into the trough. The member which forms the bottom and sides of the trough is formed of thin material so that the edges of this member, which form the portions 5, will take up but little space and does not interfere with the poultry reaching the feed in the trough.

The sides of the hopper slope upwardly and inwardly so that feed placed in the hopper will gravitate and not clog in the hopper. The hopper is provided with a ridge roof 8 one section of which is hingedly connected to the other section as shown at 9 so that the hinge section can be opened to permit the feed to be placed in the hopper.

Brackets 10 are fastened to the stationary section and have portions which extend upwardly to form bearings for the trunnions of the rotary rod 11 which prevent the poultry from roosting on the device.

From the foregoing it will be seen that I have provided a simple form of poultry feeder with the hopper so formed that there is no danger of the feed clogging therein and with the trough so formed that the poultry can readily reach the food therein and if the materials should fail to freely flow from the hopper into the trough the poultry can reach into the trough and peck at the material under the hopper which will act to release the material and cause it to flow again.

As will be seen the trough is of considerable depth so that there is always plenty of feed in the trough and this also acts to reduce the danger of the feed clogging in the hopper.

It is thought from the foregoing description that the advantages and novel features of the invention will be readily apparent.

It is to be understood that changes may be made in the combination and arrangement of the several parts provided that such changes fall within the scope of the appended claim.

I claim:

In a poultry feeder, a trough having a pair of end members of considerable thickness and a bottom and side forming member of considerable less thickness, end members each having a straight upper edge, a flat lower edge and its ends curving upwardly and outwardly from the lower edge to the upper edge with the ends of the bottom and side forming member fastened to said lower and curved end edges with its side edges extending upwardly beyond the upper edges of the end members and bent to extend inwardly and upwardly, and a hopper having its ends resting on intermediate portions of the end members of the trough.

WILLIAM F. VAHLKAMP.